J. L. ENNIS.
SAD IRON.
APPLICATION FILED APR. 23, 1910.

971,125.

Patented Sept. 27, 1910.

Witnesses
Daniel Webster, Jr
J. O'R. S. Kelly

Inventor
John L. Ennis,
By ──── , Attorney

THE NORRIS PETERS CO., WASHINGTON, D. C.

UNITED STATES PATENT OFFICE.

JOHN L. ENNIS, OF READING, PENNSYLVANIA, ASSIGNOR TO THE READING SADDLE AND MF'G. CO., OF READING, PENNSYLVANIA, A CORPORATION OF PENNSYLVANIA.

SAD-IRON.

971,125.   Specification of Letters Patent.   Patented Sept. 27, 1910.

Application filed April 23, 1910. Serial No. 557,164.

*To all whom it may concern:*

Be it known that I, JOHN L. ENNIS, citizen of the United States, residing at Reading, in the county of Berks and State of Pennsylvania, have invented certain new and useful Improvements in Sad-Irons, of which the following is a specification.

This invention relates to improvements in sad irons and the object is to provide a device in which the handle may be readily secured to or removed from the base while at the same time insuring against the accidental dropping of the base, by reason of unintentional releasing of the handle catch. To this end I provide the handle with a suitable catch operated by a lever, the catch being so constructed that even though the lever is accidentally operated and the latch opened, the base will be retained on the handle until intentionally released therefrom. I accomplish this object by forming the retaining hook in such manner that the extremity thereof is above the horizontal line of the depression in which the bar that engages it is secured.

The invention is more fully described in the following specification and clearly illustrated in the accompanying drawing, in which:—

Figure 1:
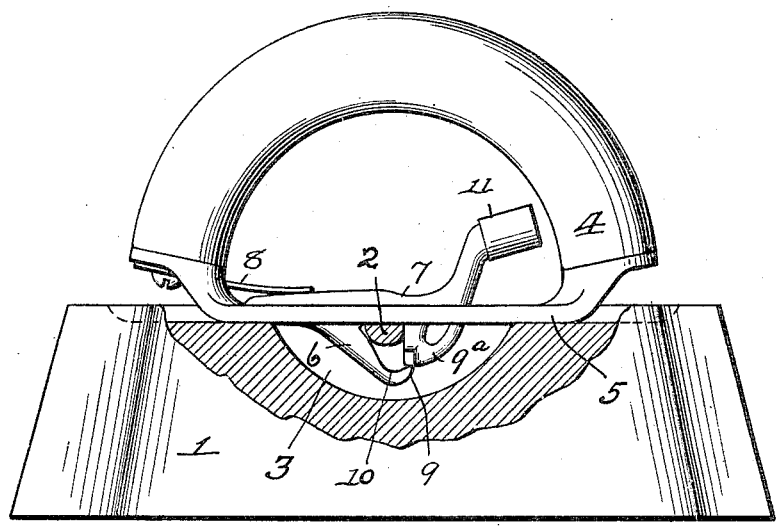
Figure 2:
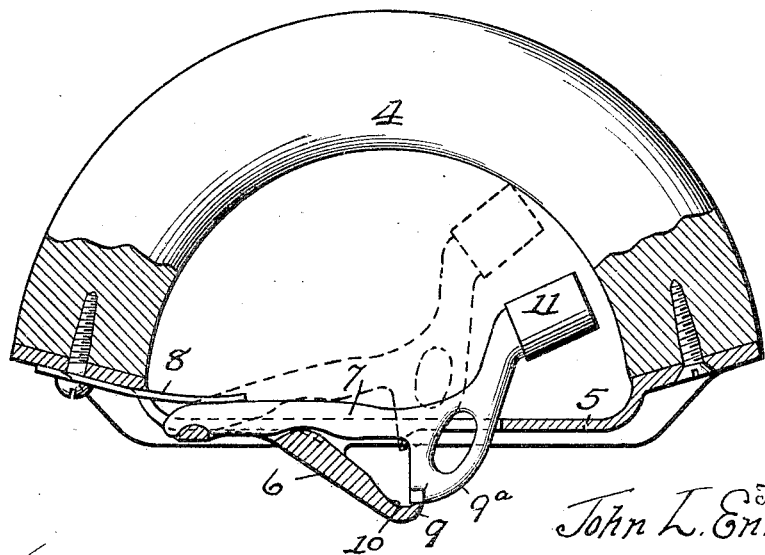

Figure 1 is a side elevation, partly in section, of my improved sad iron. Fig. 2 shows the handle, partly in section, with the locking mechanism in closed and open positions.

The numeral 1 designates the body or base of the iron. This is of the usual construction with the bar 2 adapted to be engaged by the handle catch. A depression 3 is formed in the upper face of the base on both sides of the bar, to permit the entrance of the handle catch.

The handle 4 is formed with a base plate 5 and it has an angularly arranged depending stem 6 on the under side, adapted to enter the depression at one side of the bar 2. This stem is formed with a hook at its end 9, and it has a depressed portion 10 adjoining the hook, adapted to engage the under side of the bar 2. A lever 7 is secured to the handle at one end and is backed by a spring 8. This lever has a depending lug 9ª which enters the depression 3 in the base on the side of the bar opposite the stem 6. The lever is formed with a handle 11 for engagement with the operator's fingers. When it is desired to place the handle in engagement with the base, the lever is raised thus opening the latch by withdrawing the depending lug 9ª from its engagement with the end of the hook, and allowing the stem to be entered beneath the bar. When the lever is released, the spring will cause the lug to close against the end of the hook, beneath the bar 2. Should the lever be operated accidentally, as while carrying the iron, the base will not drop from the handle for the reason that the hook on the end of the stem 6 will engage the bar 2 and suspend the iron. It will be necessary, in order to disengage the handle, to not only release the catch, but to draw the handle, while the catch is held open, toward one end, disengaging the hook from the bar 2, when it may be easily released.

Having thus fully described my invention, what I claim and desire to secure by Letters Patent is:—

1. A device of the character described, comprising a handle, a lever thereon, a lug depending from the lever, a stem depending from the handle and having an upturned free end, the lug and stem when the handle is in normal position on a flat iron being adapted to engage only the opposite side faces of the lifting bar thereof, the said upturned end of the stem when in its normal position being spaced beneath the lifting bar in a position to receive the same in case of the said stem and lug failing to properly coöperate.

2. A device of the character described for use with a sad iron having a lifting bar, comprising a handle having a base plate, a stem extending downwardly therefrom, a pivoted lever having a lug depending therefrom, the inner face of the stem inclining downwardly from the plate toward the lower end of the lug, the lower end of the stem being upturned forming a pocket or recess at the lower end of said inclined inner face, said lifting bar being adapted to be normally engaged by said lug and stem between the upper portions only of their inner faces and received by the recess or pocket at the lower end of said inclined inner face of the stem when the stem and lug fail to properly coöperate.

3. A device of the character described, comprising a handle, a lever thereon, a lug depending therefrom, a stem extending downwardly from the handle and being inclined toward the lower end of the lug thereby providing a substantially V-shaped space between the stem and lug, the upper portion only of said space being sufficient to normally accommodate the lifting bar of a sad iron, the lower portion of the stem at the base of said V-shaped space being provided in its inner face with a pocket or recess adapted to receive the said lifting bar when the stem and lug fail to properly coöperate.

In testimony whereof I affix my signature, in presence of two witnesses.

JOHN L. ENNIS.

Witnesses:
 ED. A. KELLY,
 J. O. R. KELLY.